United States Patent
Bettis et al.

(10) Patent No.: US 7,564,955 B2
(45) Date of Patent: Jul. 21, 2009

(54) SYSTEM AND METHOD FOR OUTBOUND CALLING FROM A DISTRIBUTED TELECOMMUNICATIONS PLATFORM

(75) Inventors: Sonny R. Bettis, Lawrenceville, GA (US); Jon S. Plotky, Lawrenceville, GA (US); Ian M. Moraes, Suwanee, GA (US); Philip L. Lowman, Ellijay, GA (US); James H. Spencer, Tucker, GA (US)

(73) Assignee: Glenayre Electronics, Inc., Duluth, GA (US)

( * ) Notice: Subject to any disclaimer, the term of this patent is extended or adjusted under 35 U.S.C. 154(b) by 852 days.

(21) Appl. No.: 11/170,458

(22) Filed: Jun. 29, 2005

(65) Prior Publication Data

US 2006/0002541 A1    Jan. 5, 2006

Related U.S. Application Data

(60) Provisional application No. 60/584,068, filed on Jun. 30, 2004.

(51) Int. Cl.
*H04M 1/64* (2006.01)
(52) U.S. Cl. .............. 379/88.17; 379/88.12; 379/88.18; 704/257
(58) Field of Classification Search .............. 379/88.17, 379/88.12, 207.02; 704/257
See application file for complete search history.

(56) References Cited

U.S. PATENT DOCUMENTS

| | | | |
|---|---|---|---|
| 6,556,666 B1 * | 4/2003 | Beyda et al. ............. | 379/88.12 |
| 2003/0043978 A1 * | 3/2003 | Gallagher ................ | 379/88.18 |
| 2003/0215068 A1 * | 11/2003 | Stein et al. .............. | 379/88.17 |
| 2004/0141595 A1 * | 7/2004 | Crockett et al. .......... | 379/88.17 |
| 2004/0225499 A1 * | 11/2004 | Wang et al. ................ | 704/257 |

* cited by examiner

*Primary Examiner*—Phung-Hoang J. Nguyen
(74) *Attorney, Agent, or Firm*—Smith Frohwein Tempel Greenlee Blaha, LLC; Gregory Scott Smith

(57) ABSTRACT

Outbound calling from a Voice eXtensible Markup Language (VXML) based voicemail system, which has distributed architecture, is disclosed. The voicemail system includes a media server, which is in communication with a telephone network. The media server includes multiple communication termination-link components, and the communication termination-link components are adapted to couple to trunks that extend to the telephone network. The media server also includes a network interface that is adapted to receive and provide communications to components of the telecommunications platform. The media server also includes a link-selector, a browser module, and a processor. The link-selector is adapted to select a given communication termination-link component from the plurality of communication termination-link components. The browser module is adapted to provide a browser session, which is associated with the given communication termination link, and the processor implements the link-selector and the browser module in responsive receiving an outbound notification via the network interface.

24 Claims, 3 Drawing Sheets

SYSTEM AND METHOD FOR OUTBOUND CALLING FROM A DISTRIBUTED TELECOMMUNICATIONS PLATFORM

CROSS-REFERENCE TO RELATED APPLICATION

This application claims priority to copending U.S. provisional application entitled, "ARCHITECTURE DESIGN DOCUMENT: NEXT GENERATION MESSAGE STORE PROJECT," having Ser. No. 60/584,068, filed Jun. 30, 2004, which is entirely incorporated herein by reference.

This application is related to copending U.S. utility patent application entitled "Distributed IP Architecture For Telecommunications System," filed on Mar. 15, 2005, which is entirely incorporated herein by reference.

TECHNICAL FIELD

The present invention relates to telecommunications systems and, more particularly, to dialing out of a VXML based telecommunications service system.

BACKGROUND OF THE INVENTION

The present invention relates to distributed IP systems and telecommunication systems and, more particularly, to a multi-functional telecommunications system with geographically dispersible components that interact over a distributed IP architecture.

Over the past several decades, voicemail has continued to expand and establish itself as a key element in the successful operations of most businesses. The typical voicemail system of today can take on a variety of forms, including a computer card that can operate within a personal computer that is connected to a businesses telephone system, or a computer card or component that is directly integrated into the businesses telephone system, or as a service provided by a telecommunications company.

Computer based voicemail systems of today are generally very effective in receiving and storing inbound messages, and they provide many features such as call forwarding and remote account accessing. However, a problem associated with today's computer based voicemail systems is generating an outbound call, i.e., a call from an account of a subscriber of a voicemail system to a destination telephone number.

Thus, there exists a need in the art for a telecommunications service platform that performs outbound calling.

SUMMARY OF THE INVENTION

Briefly described, in architecture, one embodiment of the distributed telecommunications platform, among others, includes a media server that is communication with a telephone network. The media server can be implemented as including multiple communication termination-link components, which are adapted to couple to trunks extending to the telephone network, and a network interface, which is adapted to receive and provide communications to components of the telecommunications platform. The media server also includes a link-selector, a browser module, and a processor. The link-selector is adapted to select a given communication termination-link component from the plurality of communication termination-link components. The browser module is adapted to provide a browser session, which is associated with the given communication termination link, and the processor implements the link-selector and the browser module in responsive receiving an outbound notification via the network interface.

Embodiment of the present invention can also be viewed as providing methods for providing outbound calls from a voice-mail service. In this regard, one embodiment of such a method, among others, can be broadly summarized by the following steps: receiving an outbound notification request, the outbound notification request including a Uniform Resource Locator (URL) for a Voice eXtensible Markup Language (VXML) page; selecting a trunk for an outbound telephone call; opening a VXML browser session; associating the VXML browser session with the selected trunk; retrieving the VXML page using the URL; and using the VXML page to dial out, over the selected trunk, to a communications device.

Other systems, methods, features, and advantages of the present invention will be or become apparent to one with skill in the art upon examination of the following drawings and detailed description. It is intended that all such additional systems, methods, features, and advantages be included within this description, be within the scope of the present invention, and be protected by the accompanying claims.

DETAILED DESCRIPTION OF THE INVENTION

The present invention provides a distributed IP architecture, also described as a next-generation communications platform, for telecommunications equipment, such as a PBX, voicemail system, or the like. By utilizing the architecture of the present invention, the various functionalities of the telecommunications equipment can be divided amongst various physical components and the physical components can be geographically dispersed. Each of the components communicates with each other, as needed, through independent interfaces to an IP network. The complexities of interfacing to the telephone network are handled through a single gateway component and a simplified protocol is used for communication between the remaining components of the telecommunications equipment or to the telephone network through the gateway component.

It should be understood that the distribution of functionality illustrated in the figures and described, although having novel aspects in itself, is not the only acceptable arrangement, and aspects of the present invention could be incorporated into a system that includes fewer or more components and a different arrangement of functionality among the components.

Now turning to the drawings, in which like labels refer to like elements throughout the several views, various aspects and features of the present invention are described.

Figure 1:
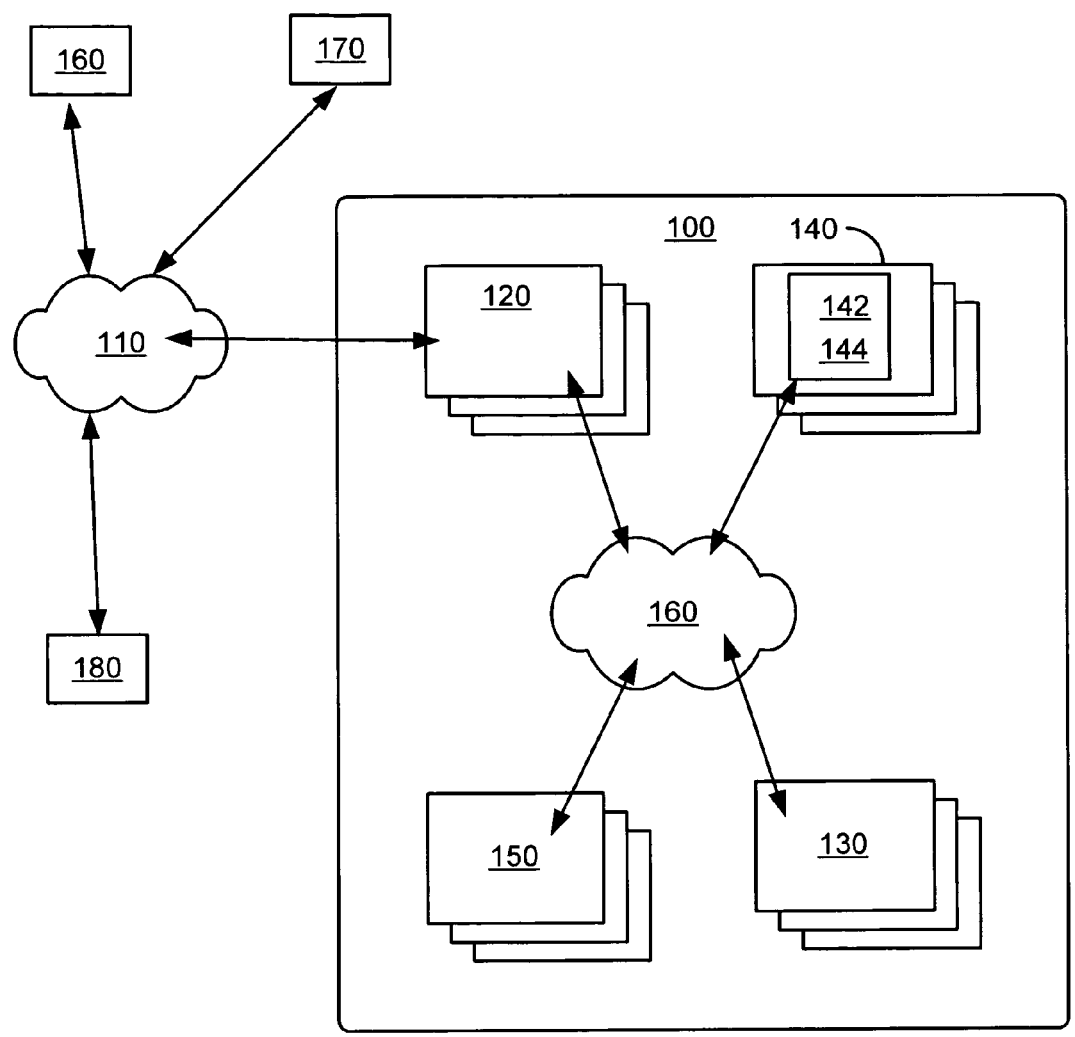
FIG. 1 is a block diagram illustrating an exemplary embodiment of a distributed voice messaging system in communication with a telephone network.

FIG. 1 is a system diagram illustrating the components and the connectivity of an exemplary next-generation communications platform 100. One aspect of the present invention is a distributed IP-based architecture for telecommunications equipment that, among other things, can provide telecommunication services such as voicemail, call forwarding and other telecommunication features. In the illustrated embodiment, the next-generation communications platform 100 has a distributed IP architecture and is connected to a telephone network 110. The telephone network 110 can be, among others, a wireless telephone network or a Public Switched Telephone Network (PSTN). The communications platform 100 is illustrated as including one or more media servers (MS) 120, one or more system management units (SMU) 130, one or more application servers (AS) 140 and one or more central data and message store (CDMS) 150, which are connected by a network 160. Typically, the network 160 is an Internet Protocol (EP) network such that communications over the IP network conform to an internet protocol (EP), which are well known in the art.

Briefly described, the media servers 120 terminate IP from components of the communications platform 100 and/or terminate circuit switched traffic from the telephone network 110. The media servers 120 are also responsible for trunking and call control. The media servers 120 are adapted to, among other things, dial telephone numbers associated with communication devices coupled to the telephone network 110. For example, the media servers 120 can dial the telephone number of a telephone 160, a facsimile machine 170, and/or a pager 180. The media servers 120 are also adapted to receive and process input from the telephone network 110.

Among other things, the application server 140 generates dynamic VoiceXML (VXML) pages for various applications. The application servers 140 provide the VXML pages to the media servers 120, which render the VXML pages or portions of the VXML pages. The applications servers 140 also provide an external interface to the communications platform 100 through web pages provided to subscriber computers 170.

The SMU 130 is a management portal that enables service providers to provision and maintain subscriber accounts and manage network elements from a centralized web interface.

The CDMS 150 stores user-communications such as, but not limited to, voice messages and facsimiles, and stores subscriber records, and manages specific application functions including notification. In some embodiments, the CDMS 150 stores subscriber customizers and subscriber attributes, both which are described in detail hereinbelow.

Each of the components in the next-generation communications platform 100 is independently scalable and independently interconnected onto the network 160. Thus, the components can be geographically distributed but still operate as a single communications platform as long as they can communicate with each other over the network 160. This is a significant advantage of the present invention that is not available in state-of-the-art communication systems. Selected components of the communication platform 100 are described in greater detail hereinbelow.

System Management Unit (SMU)

The SMU 130 provides a centralized point for service providers to manage all network elements, providing remote access, maintenance, and backup functionality. The SMU 130 provides a single interface for provisioning, alarming, reports, and subscriber migration. The SMU 130 integrates and customizes systems with new elements and applications, and provides operational support and network management functions for carriers experiencing swiftly growing networks and exploding traffic volumes.

Application Server (AS)

The modular design of the next-generation communications platform has the added advantage that it is easy to deploy enhanced services, such as voice dialing and voice navigation, unified communications solutions, multimedia messaging services, and presence and availability management applications. Adding applications to the platform is accomplished via the addition of standard application servers 140 to the common platform Each application server 140 generates application documents such as, but not limited to, VoiceXML pages. The application server 140 leverages a web application infrastructure to interface with back-end data stores such as CDMS 150 to generate the VXML pages.

The overall web application infrastructure separates the core service logic (i.e., providing the business logic) from the presentation details (VXML) to provide a more extensible application architecture. In one embodiment, the application server 140 utilizes Java 2 Enterprise Edition (J2EE) environment and Java Server Pages (JSP) to create the dynamic VXML pages for the media server. Combining these technologies enables rapid incorporation of Speech Application Language Tags (SALT) to provide interoperability (multimodal) between applications like WAP, HTML, XHTML and voice—allowing the end user to simultaneously input data via voice command and receive presentation via WAP or HTML.

To create an environment for easy application development, the application server 140 preferably supports Template+ JSPs. Applications are implemented in JSPs using an API for access to messaging functions. These JSPs are readily modifiable making changes in application behavior and creation of new applications very easy.

The application servers include application server software 142 for providing at least some of the functionality of the application server. For example, the application server software includes a Voice extensible Markup Langauge (VXML) page generator (not shown) and outbound call module 144. Among other things, the outbound call module 144 selects one of the media servers 120 to handle an outbound call and provides the selected media server with an outbound notification request. In one embodiment, the outbound call module 144 select one of the media servers to handle the outbound call using a hierarchal selection scheme. First, the outbound call module selects a set of media servers 120 for handling the outbound call and then the outbound call module selects one media server from the selected set of media servers. Conceptually, the plurality of media servers are subdivided into sets of media servers with each set having certain attributes.

Media Server (MS)

Figure 2:
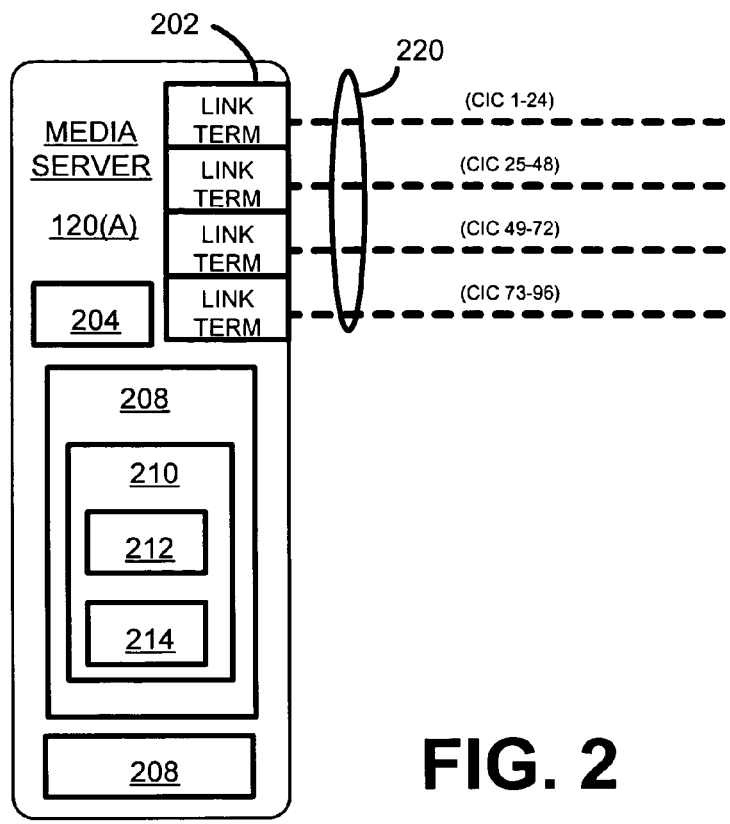
FIG. 2 is a block diagram of a media server.

Referring to FIG. 2, which illustrates selected components of an exemplary media server 120(A), the MS 120(A) includes a plurality of communication termination-link components 202, a processor 204, a memory 206, and a network interface 208. In one embodiment, the network interface 208 is a signaling transport (SIGTRAN) interface. SIGTRAN is an Internet Engineering Task Force (IETF) specification for carrying Signaling System 7 (SS7) messages over an IP network.

The communication termination-link components 202 provide termination points for communication links 220 coming from the telephone network (TN) 110. For the sake of clarity, the communication links 220 will be described as T1 links, but that description is intended as a non-limiting description, and those skilled in the art are aware of alternative communication links such as, but not limited to, T1C, T2, T3, T4, PRI, or other similar telecommunication links. Each T1 link 220 contains 24 carrier identification codes (CICs), which are associated with corresponding voice channels over which calls are conducted.

The memory 206 includes application software 210, which is run on the processor 204, to provide one or functions of the MS 120(A). Included in the application software 210 is a browser module 212 and a link-selector 214. The link-selector 214 is adapted to choose one of the communication termination-link components for carrying outbound communications from the communication platform 100 to a communication device such as telephone 160, facsimile machine 170 and/or pager 180 via the telephone network 110. When the communication device is a telephone 160 or a facsimile machine, the selected communication termination-link component typically carries inbound communications from the communication device to the communication platform 100. The link-selector is invoked by the processor 204 receiving an outbound notification request. Typically, the application server 140 generates an outbound notification request and sends the outbound notification request to the media server 120 via the network 160. The link-selector 214 can choose a communication termination-link component for handling an outbound communication using various selection schemes such as "round-robin." In a round-robin selection scheme, the link-selector 214 has a list of some or all of the communication termination-link components and the link-selector 214 keeps track of the most recently selected communication termination-link component. When the link-selector 214 needs to select another communication termination-link component, the link-selector 214 chooses the next communication termination link component in the list of communication termination-link components, and starts back at the beginning of the list when the last element in the list has been chosen. Various round-robin selection schemes include low-to-high, high-to-low, odd only (low-to-high or high-to-low) and even only (low-to-high or high-to-low), where the lowest is the first element listed and the highest is the last element listed.

The browser module 212 is typically a Voice extensible Markup Language browser, which is typically invoked by the processor 204 in response to the processor receiving an outbound notification request. After the link-selector has selected a given communication termination-link component 202, the processor 204 invokes the browser module 212 to open a browser session, which is then associated with the given communication termination-link component. The browser session provides an interface for communications between the communication platform 100 and the telephone network 110. Among other things, a browser session can provide outbound communications by dialing a telephone number for a communication device (160, 170, 180) using the given communication termination-link component. The browser session is adapted to receive input such as voice input and Dual-tone-multi-frequency (DTMF) and process the input. Consequently, the media server 120(A) typically includes a voice-recognition module (not shown), which can be implemented in hardware, software, firmware, or any combination thereof. The voice-recognition module is invoked by the browser session for processing voice input.

Among other things, the MS 120 terminates circuit-switched traffic from the telephone network 110. The MS 120 is responsible for call set up and control within the platform architecture. The MS 120 processes input from the user in either voice, DTMF format or other signaling scheme (much like a web client gathers keyboard and mouse click input from a user). The MS 120 presents content to the user in voice form (similar in principle to graphic and text displayed back to the user on a PC client). This client/server methodology enables rapid creation of new applications and quick utilization of content available on the World Wide Web.

In addition, the MS 120 receives inbound calls and provides outbound calls.

When the MS receives an inbound call, it generates a service request. The service request may take on a variety of forms and may represent a variety of services such as, but not limited to, an inbound call voice call, a call transfer, an inbound facsimile, an inbound text message, or a variety of inbound or outbound services typical to a telephonic or voice-mail system. The media server 120 can use functions such as, but not limited to, Automatic Number Identification (ANI) and Dialed Number Identification Number Service (DNIS) to gather information such as, but not limited to, the calling number and the called number.

As will be explained in detail hereinbelow, the MS 120 processes outbound calls via outbound notification requests from the AS 140. The requests are typically transmitted to the MS 120 from the AS 140 via the network 160 in a message that conforms to a protocol such as Transmission Control Protocol (TCP). The outbound notification request typically includes a Uniform Resource Locator (URL) for a VXML page generated by the AS 140. The MS 120 retrieves the XVML page using the URL and renders at least a portion of the VXML page.

Common Database and Message Store (CDMS)

Figure 3B:
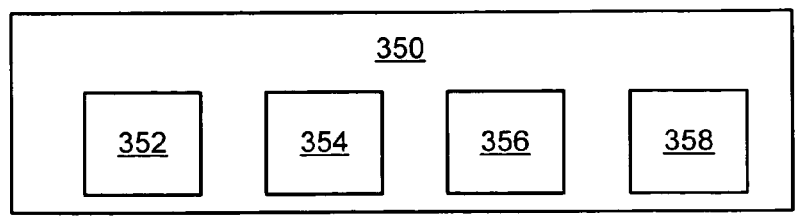
FIG. 3B is a block diagram of a outbound trigger.
Figure 3A:
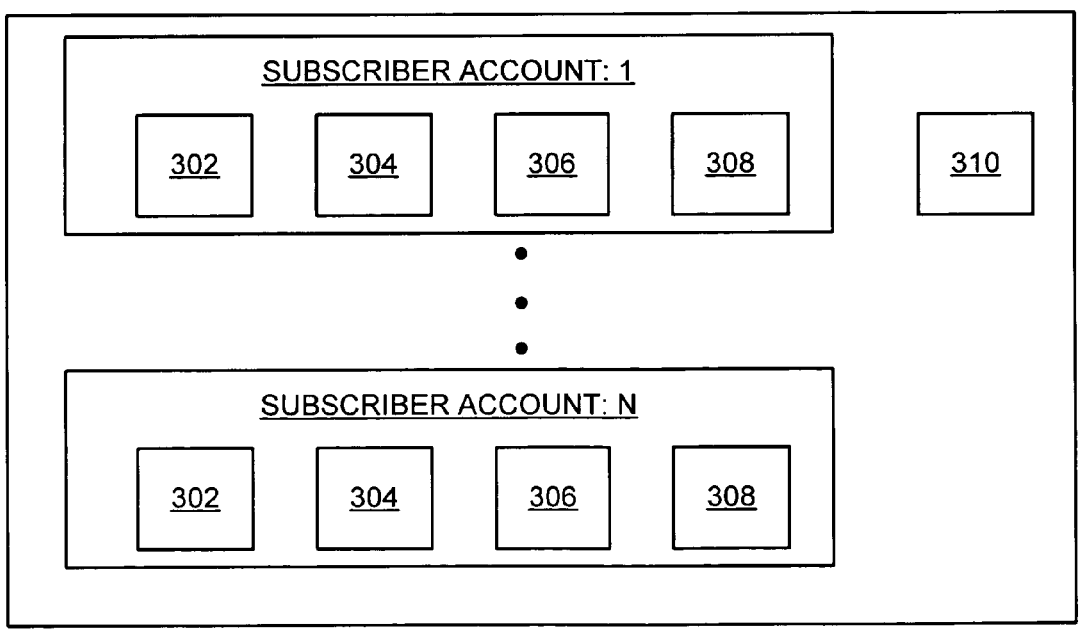
FIG. 3A is a block diagram of content stored in a central data and message store.

Referring to FIG. 3A, the CDMS 150 is preferably designed with fully redundant components and utilizes reflective memory and Redundant Array of Independent Disks (RAID) technology for fault tolerance, immediate fail over and recovery. This ensures five 9's availability for associated hardware and software components. Essential disk drive and RAID controller components are preferably "hot swappable" eliminating the need to power down the system for replacements. With the CDMS 150, performance is optimized for the unique characteristics of voice messaging, eliminating the performance degrading, unnecessary e-mail-centric database functionality that comes with the searching and sorting of e-mail stores.

The CDMS 150 can utilize standard of the shelf e-mail storage systems. The message store is abstracted through the use of Java middleware that allows the selection of the message store to be transparent to the application, enabling each message type to be stored in the most efficient store possible.

The CDMS 150 has sufficient storage capacity such that the communications platform 100 can provide services to multiple subscribers. Stored in the CDMS 150, among other things, are voice/audio messages 302, subscriber records 304, subscriber account information 306, facsimiles 308.

Voice/audio messages 302 are stored on the CDMS 150 when a caller leaves a voicemail message for a subscriber. Voice/audio messages 302 also include voice/audio messages transferred and or forwarded between subscribers. Voice/audio messages 302 can also include the subscriber's "greeting," which can be played to a caller.

Records for each subscriber are stored in subscriber records 304 for that subscriber. Information included in subscriber records includes, but is not limited to, the number of calls and/or faxes for a give time period, number of saved messages, number of recorded messages, number of non-retrieved messages.

Subscriber account information 306 includes subscriber name, telephone number for the account, distribution lists, forwarding telephone number(s), destination telephone number(s), and billing information.

The CDMS 150 also includes an outbound triggering module 310, which monitors the CDMS 150 and provides an outbound trigger 350 (See FIG. 3B) to the application server 140. In one embodiment, the outbound triggering module 310 is configured to send an outbound trigger 350 responsive to determining that a triggering event has occurred.

Referring to FIG. 3B, the outbound trigger 350 is an exemplary message having a plurality of fields. In some embodiment, the outbound trigger 350 can include fewer fields, different fields, and/or more fields. Included in the outbound trigger 350 is a subscriber account number 352, a "destination telephone number" 354, a call-type identifier 356, and a data pointer 358. The subscriber account number 352 typically corresponds to the telephone of the subscriber's telephone number at the communication platform 100. The subscriber account number 352 can be used for, among other things, billing purposes and linking back to the subscriber's account. The "destination telephone number" 354 is the telephone number that the media server dials to notify the subscriber. The call-type identifier 356 is used for, among other things, identifying the type of outbound call being invoked. Non-limiting examples of types of calls include facsimile calls, pager calls, and voice calls in which an audible message is conveyed to the subscriber. The data pointer 358 is a pointer that points to a message or facsimile stored in the CDMS 150.

Outbound Call Operation

Figure 4A:
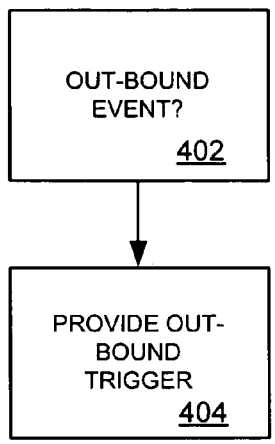
FIGS. 4A-4C are flow diagrams of steps for outbound calling.
Figure 4B:
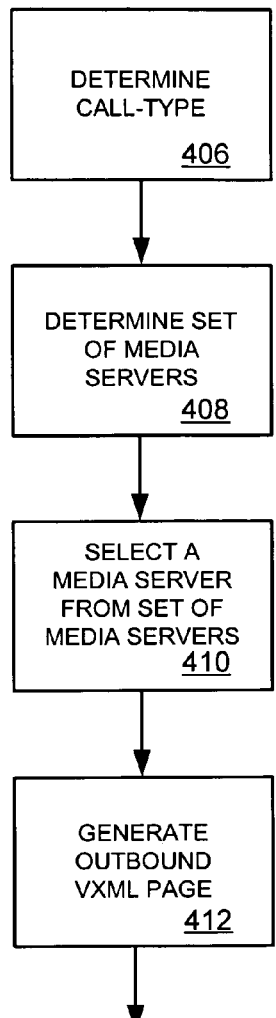
Figure 4C:
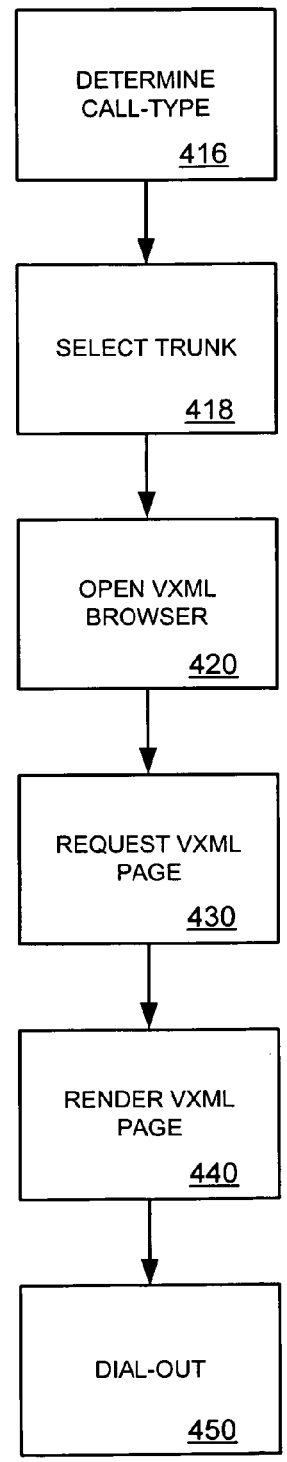

An exemplary method of providing an outbound call is illustrated in FIGS. 4A-4C. In step 402, the outbound triggering module 310 monitors the CDMS 150 to determine whether a outbound event has occurred. Non-limiting examples of triggering events include time-of-day, receipt of a facsimile, receipt of a voicemail message, receipt of a "priority-code", and approaching a predetermined size limitation. For example, a subscriber might be allocated a fixed number of bytes in the CDMS, and when the size stored messages and/or stored facsimiles approach the fixed number, the outbound triggering module 310 will send the outbound trigger 350.

In another example, a caller might call the communication platform 100 and enter a "priority-code" that causes the outbound triggering module 310 to send the outbound trigger 350. Typically, the caller is prompted to enter the "priority-code" and a voicemail message, which is then stored in voice/audio messages 302.

In another example, the calling telephone number could be the triggering event.

Calls received by certain predetermined telephone numbers will result in the generation of an outbound trigger 350.

In yet another example, a trigger event might be subscriber initiated outbound calling. The subscriber could decide to forward a message or facsimile to another person, voicemail account, facsimile machine, etc. and the call forwarding feature of the voicemail system would result in the generation of the outbound trigger 350.

In step 404, the outbound triggering module 310 provides the application server 140 with the outbound trigger 350. Typically, the outbound trigger 350 includes the "destination telephone number" 354 and the call-type identifier 356. In some embodiments, the outbound trigger 350 includes other information such as, but not limited to, the subscriber account number 352 and the data pointer 358.

Referring to FIG. 4B, which illustrates exemplary steps that can be implemented by the application server, in step 406, the application server receives the outbound trigger 350 and used the outbound trigger 350 to determine the call-type for the outbound call.

In step 408, the application server determines a particular set of media servers to use for the outbound call. As previously described, the plurality of media servers 120 can be conceptually subdivided into sets of media servers, where a set of media servers are intended to perform certain outbound calls. Furthermore, it should be remembered that a particular media server can belong to more than one set of media servers. As a non-limiting example, one set of media servers can be designated for handling outbound facsimile calls and another set can be designated for handling toll-free long distance calls and a third set can be designated for handling regular (or non-toll free) long distance call, etc.

In step 410, the application server selects a particular media server from the selected set of media servers. In some embodiments, the particular media server is selected using a round-robin scheme. In a round-robin selection scheme, the application server keeps track of the most recently selected media server, and when the media server needs to select another media server, the application server chooses the next media server from a list of media servers, and starts back at the beginning of the list when the last element in the list has been chosen. The list corresponds to the selected set of media servers. In other words, the media server will have a list for each set of media servers.

Various round-robin selection schemes include low-to-high, high-to-low, odd only (low-to-high or high-to-low) and even only (low-to-high or high-to-low), where the lowest is the first element listed and the highest is the last element listed. It should be noted that round-robin selection is only one type of selection scheme and is provided as a non-limiting example.

In step 412, the application server generates a VXML page. Typically, the VXML page includes information such as the subscriber account number 352, the "destination telephone number" 354, the call-type identifier 356, and the data pointer 358. In some situations, such as when the call-type is a "page" for a pager, the data pointer may not be included because the "page" can list the subscriber account number as being the entity that sent the "page".

In step 414, the application server generates an outbound notification request, which includes the URL of the VXML page for the outbound call and, in some embodiments, the call-type identifier. The application server then provides the outbound notification request to the selected media server.

Referring to FIG. 4C, which illustrate exemplary steps performed by the media server, in step 416, the media server receives outbound notification request and uses the outbound notification request to, among other things, determine the call-type of the outbound call.

In step 418, the media server selects a trunk for the outbound call. In some embodiments, the media server can use the call-type of the outbound call as a criteria for selecting the trunk. The media server can also use other selection schemes such as a round-robin selection scheme and/or a combination of schemes. For example, the media server can first choose a set of trunks based on call-type and then a specific trunk based on round-robin selection.

In step 420, the application server opens a VXML browser session. The VXML browser session remains open during the outbound call and provides content to the telephone network 110. Upon the ending of the outbound call, the browser session is closed. The browser session is analogous to a browser window for displaying content to a user on a video screen, except that instead of displaying information, the browser session renders audio content to the telephone network 110. The browser session can also receive and process audio information from the telephone network.

In step 430, the media server requests the VXML page for the outbound call from the application server using the URL of the VXML page. In step 440, after receiving the requested VXML page, the browser session renders the received VXML page. The VXML page includes the destination telephone number, and in step 450, the browser session dials the destination telephone number.

The VXML page can include call-type dependent instructions. For example, if the call-type is a "page" for a pager, then the instructions might indicate that no content is to be provided until a "greeting" has been received and completed. (Typically, the end of a "greeting" is defined by a predetermined tone.) Alternatively, if the call-type is a facsimile, then the instructions would indicate a facsimile stored in the CDSM 150 is to be retrieved using the data pointer. The instructions would then indicate that the retrieved facsimile should be transmitted after synchronization with the receiving facsimile machine. However, if the call-type is a "voice call" the instructions might be to provide a predetermined message in response to the dialed communication device being answered. For example, the predetermined message might be "Please call your voicemail system." Alternatively, the instructions might be to play one of the messages stored in the CDMS in response to the called communication device being answered. In that case, the browser session uses the data pointer to retrieve the stored message. On the other hand, the instructions for a "voice call" might include waiting for confirmation from the person who answers the called communication device before providing a stored message. Thus, the browser session might be instructed to start off with "You have a message. Please enter your password," which might be entered audibly or by touch-tone. The browser session would then be instructed to confirm the password before providing a stored message.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A distributed voicemail system comprising:
   a central data and message store (CDMS) for determining whether a triggering event occurs and operable to provide an outbound trigger, wherein the outbound trigger is provided in response to the CDMS determining that a triggering event has occurred;
   an application server in communication with the CDMS, the application server for receiving the outbound trigger, provide an outbound notification, generate a Voice eXtensible Markup Language (VXML) page having a telephone number therein, wherein the application server provides the outbound notification in response to receiving the outbound trigger, wherein the outbound notification includes a Uniform Resource Locator (URL) for the VXML page;
   a media server in communication with the application server and in communication with a telephone network, the media server for receiving the outbound notification, open a VXML browser session, and use the XVML browser session and the VXML page to dial the telephone number, via the telephone network, of a communications device; and
   wherein a user-communication is stored in the CDMS, wherein the application server generates a given VXML page having a pointer to the user-communication therein and provides the given VXML page to a VXML browser, wherein the VXML browser uses the pointer to retrieve at least a first portion of the user-communication, wherein the VXML browser provides at least a second portion of the user-communication, and wherein the VXML browser provides the second portion in response to receiving input from the communications device.

2. The distributed voicemail system of claim 1, wherein the communications device is a telephone.

3. The distributed voicemail system of claim 1, wherein the communications device is a facsimile machine.

4. The distributed voicemail system of claim 1, wherein the input is a facsimile tone.

5. The distributed voicemail system of claim 1, wherein the input is a password.

6. The distributed voicemail system of claim 1, wherein the communications device is a pager.

7. The distributed voicemail system of claim 1, wherein the media server includes a plurality of communication link-termination components, wherein the media server is adapted to select one communication link-termination component from the plurality of communication link-components in response to receiving the outbound notification, wherein the selected communication link-termination component communicates the dialed telephone number to the telephone network.

8. The distributed voicemail system of claim 7, wherein the media server selects the communication link-termination component using a round-robin selection scheme.

9. The distributed voicemail system of claim 1, wherein the distributed voicemail system includes a plurality of media servers, and wherein the application server is adapted to select a given media server from the plurality of media servers using information included in the outbound trigger.

10. The distributed voicemail system of claim 9, wherein the plurality of media servers comprises multiple sets of media servers, each set of media servers being associated with a specific call-type, wherein the outbound trigger includes a call-type identifier, and wherein the application server determines a particular set of media servers using at least the call-type identifier.

11. The distributed voicemail system of claim 9, wherein the media server selects the given media server from the set of specific media servers using a round-robin selection scheme.

12. A method for providing outbound calls from a voicemail service operating within a voicemail server, the method comprising the steps of:
   (a) receiving an outbound notification request, the outbound notification request including a Uniform Resource Locator (URL) for a Voice eXtensible Markup Language (VXML) page;
   (b) selecting a trunk for an outbound telephone call;
   (c) opening a VXML browser session;
   (d) associating the VXML browser session with the selected trunk;
   (e) retrieving the VXML page using the URL; and
   (f) using the VXML page to dial out, over the selected trunk, to a communications device, wherein the step (f) includes rendering the VXML page, and wherein steps (a) through (f) are performed at a media server,
   (g) determining whether an outbound event has occurred;

(h) responsive to determining that an outbound event has occurred, providing an outbound-trigger to an application server; and responsive to receiving the trigger at the application server, further comprising the steps of:

(i) generating an outbound notification request; and (j) providing the outbound notification request to the media server, wherein steps (a) through (f) are performed at the media server; and (k) selecting the media server from a plurality of media servers.

13. The method of claim 12, wherein the selection of the media server is based at least in part based upon information carried in the outbound-trigger.

14. The method of claim 13, wherein the plurality of media servers comprises multiple sets of media servers, each set of media servers being associated with a specific outbound call-type, and wherein step (k) further includes the steps of:

determining an outbound call-type using information carried in the outbound trigger;

selecting a particular set of media servers, wherein the particular set of media servers is associated with the outbound call-type; and selecting a particular media server from the particular set of media servers.

15. The method of claim 14, wherein the particular media server is selected based upon a round-robin selection scheme.

16. The method of claim 12, wherein the trunk is selected from a plurality of trunks based upon a round-robin selection scheme.

17. The method of claim 12, further including the steps of:

storing a user-communication;

generating a given VXML page having a pointer to the user-communication therein;

providing the given VXML page to the VXML browser;

retrieving at least a first portion of the user-communication using the pointer;

using the VXML browser to provides at least a second portion of the user-communication.

18. The method of claim 17, further including the step of:

receiving, via the selected trunk, input from the communications device.

19. The method of claim 18, wherein the communications device is a telephone.

20. The method of claim 18, wherein the communications device is a facsimile machine.

21. The method of claim 20, wherein the input is a facsimile tone.

22. The method of claim 18, wherein the input is a password.

23. The method of claim 12, wherein the communications device is a pager.

24. In a distributed telecommunications platform, a media server that is connected to a telephone network, the media server comprising:

a plurality of communication termination-link components, each communication termination-link component for coupling a trunk that extends to the telephone network;

a network interface for receiving and providing communications to components of the telecommunications platform;

a link-selector for selecting a given communication termination-link component from the plurality of communication termination-link components;

a browser module for providing a browser session, wherein a given browser session is associated with the given communication termination link; and a processor in communication with the plurality of communication termination-link components, the network interface, the link-selector, and the browser module, wherein responsive to the processor receiving an outbound notification via the network interface, the processor implements the link- selector and the browser module;

wherein the outbound notification includes a Uniform Resource Locator (URL), and wherein the given browser session uses the URL to request a VXML page, and wherein the browser module is for receiving input from a communications device via the selected communications termination-link.

* * * * *